Patented Nov. 24, 1936

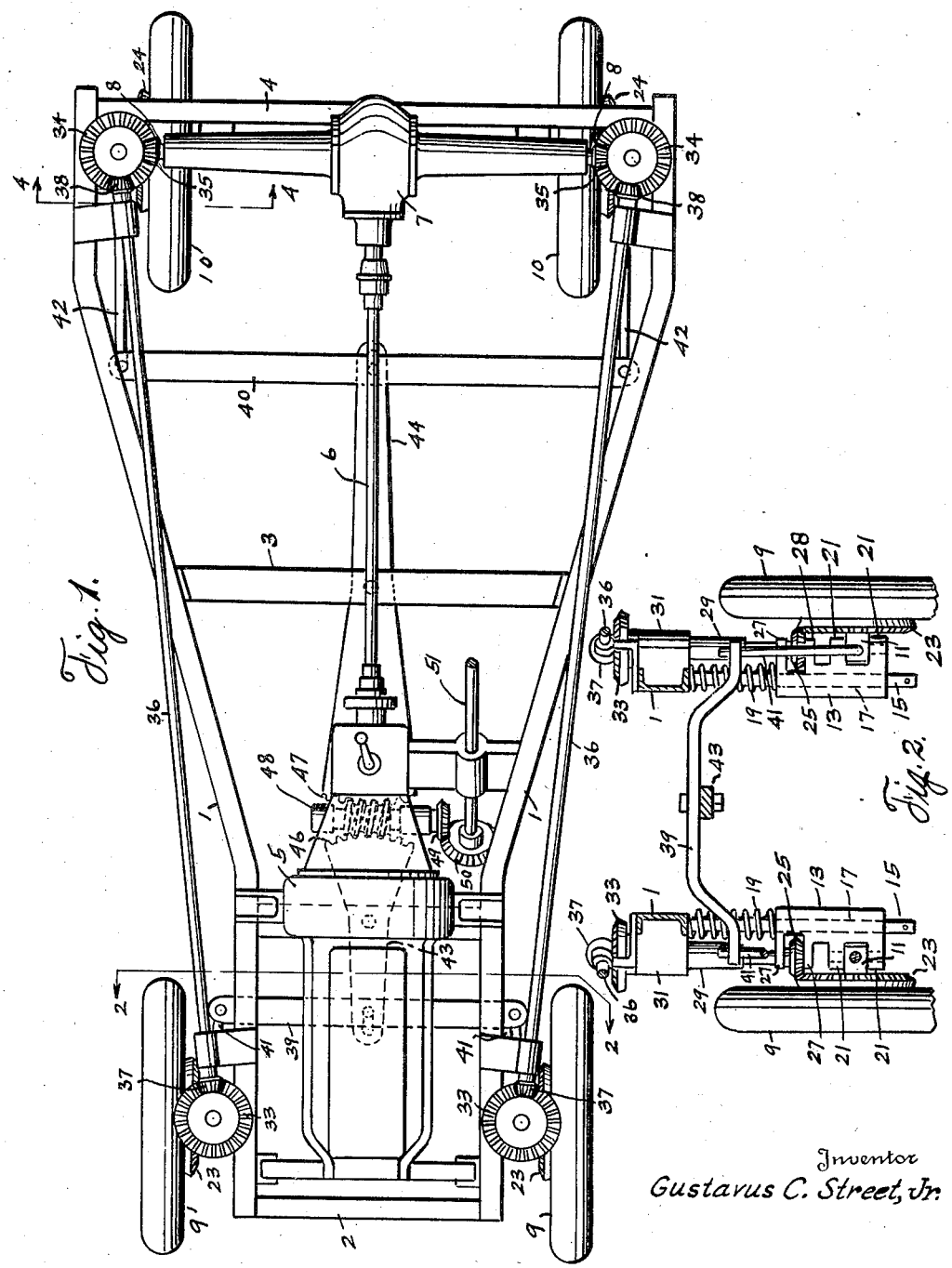

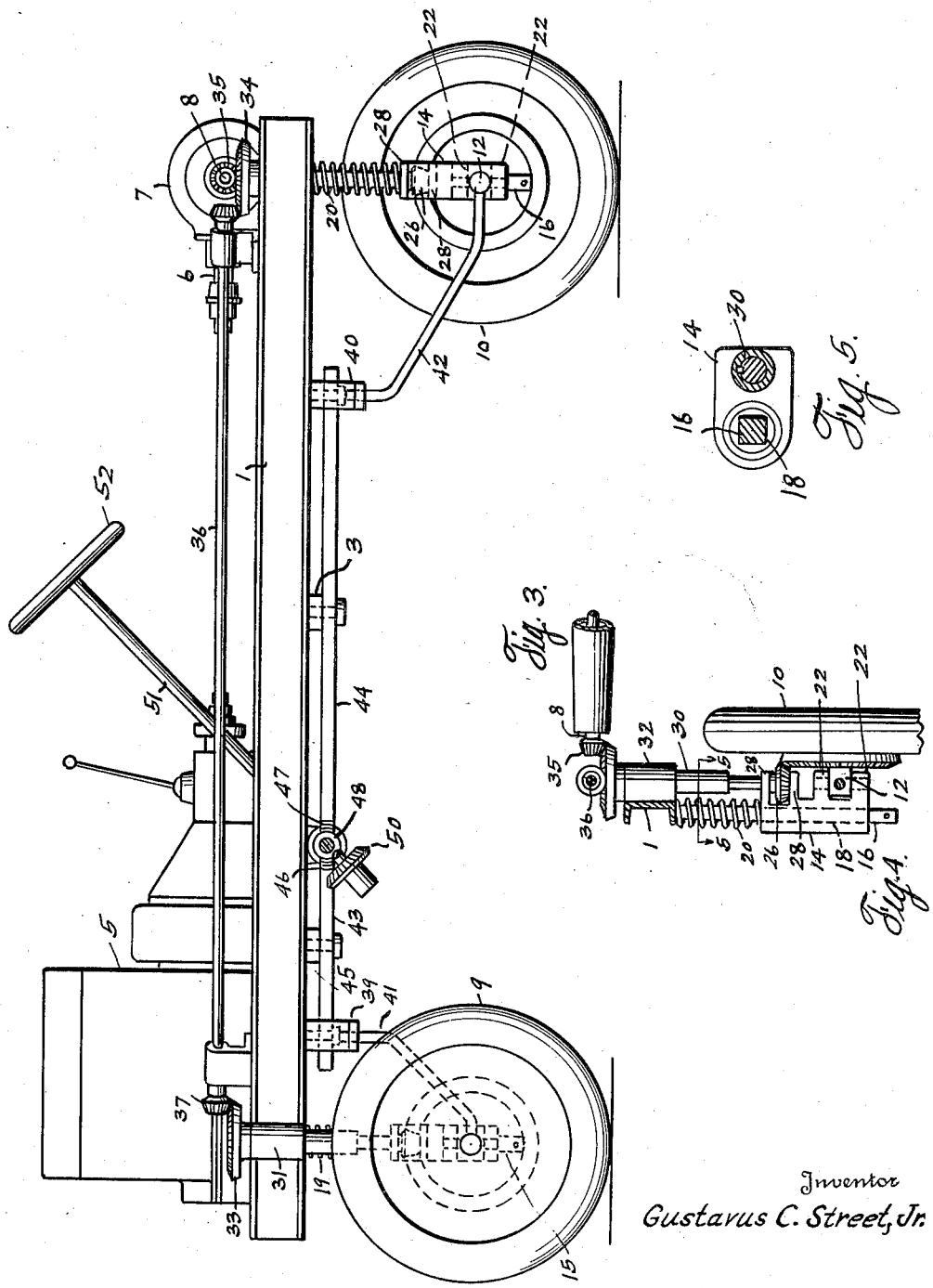

2,061,719

UNITED STATES PATENT OFFICE 2,061,719

MOTOR DRIVEN VEHICLE

Gustavus C. Street, Jr., Houston, Tex.

Application February 1, 1935, Serial No. 4,526

2 Claims. (Cl. 180—50)

This invention relates to a motor driven vehicle.

An object of the invention is to provide a vehicle of the character described, especially designed for use as a tractor and wherein all four wheels are driven.

Another object of the invention resides in the provision of novel driving means whereby power is taken off from the motor and applied to the traction wheels.

A further object of the invention resides in a novel steering mechanism whereby the front and rear wheels may be simultaneously controlled to effect a short turning movement of the tractor.

A still further object of the invention resides in novel means for mounting the framework of the vehicle on the wheels, said means including a novel type of spring for yieldingly supporting the framework.

With the above and other objects in view, the invention has particular relation to certain novel features of construction, operation, and arrangement of parts, an example of which is given in this specification and illustrated in the accompanying drawings, wherein:—

Fig. 1 shows a plan view of the tractor.

Fig. 2 shows a fragmentary cross-sectional view taken on the line 2—2 of Fig. 1.

Fig. 3 shows a side elevation, partly in section.

Fig. 4 shows a fragmentary cross-sectional view taken on the line 4—4 of Fig. 1, and Fig. 5 shows a fragmentary cross-sectional view taken on the line 5—5 of Fig. 4.

Referring now more particularly to the drawings wherein like numerals of reference designate similar parts in each of the figures, the numerals 1, 1, designate the side members of the framework which are preferably formed of channels and which are connected by the front, intermediate, and rear cross-braces, 2, 3, and 4, respectively.

Supported on the framework or chassis is a conventional motor 5 having the rearwardly extending drive-shaft 6, which is operatively connected, through the differential 7, with the rear axles 8, 8.

Conventional front and rear traction wheels 9, 9, and 10, 10, are provided, which are mounted on the front and rear spindles 11, 11, and 12, 12.

There are the front and rear boxings 13, 13, and 14, 14. The chassis is mounted on the depending front guides 15, 15, and rear guides 16, 16, which are polygonal in cross-section, and which work through correspondingly shaped vertical front and rear bearings 17, 18, in the respective front and rear boxings 13 and 14.

The guides 15, 16, slide freely through said bearings, and surrounding said guides and interposed between the side members 1 and the front and rear boxings 13, 14, are the front and rear coil springs 19, 19, and 20, 20, which yieldably support the chassis on said boxes.

On the outer sides of the boxings 13 are the spaced lugs 21, 21, and on the inner sides of the rear boxings 14, are the spaced lugs 22, 22, and the front and rear spindles 11, 12, are mounted to pivot between these respective pairs of lugs 21, and 22, to swing fore and aft.

Each front wheel has an inside beveled gear 23, fixed thereto, and concentric therewith, and each rear wheel has an outside beveled gear fixed thereto and concentric therewith, and in mesh with these respective gears are the front and rear pinions 25, 25, and 26, 26. These pinions 25, 26, are located between the front lugs 27, 27, and the rear lugs 28, 28, of the front and rear boxings, 13, 14.

The pinions 25, 26 are fixed on the lower ends of the vertical front and rear shafts 29, 29, and 30, 30. These shafts work in suitable front and rear vertical bearings, 31, and 32, carried by the side members, 1, 1, of the framework. Said shafts are formed of telescopically arranged sections splined together as shown in Fig. 5, and to their upper ends the front and rear bevel gears 33, 33, and 34, 34, are fixed.

The outer ends of the rear axles have the pinions 35, 35, fastened thereon and in mesh with the corresponding bevel gear wheels 34.

There are the side transmission shafts 36, 36, on the forward ends of which are fastened the pinions 37, 37, in mesh with the corresponding bevel gears 33, and fastened on the rear ends of which are the pinions 38, 38, in mesh with the bevel gears 34, 34.

Accordingly, the rear traction wheels will be driven from the rear axles 8 through the shafts 30, 30, and the front traction wheels will be driven from the rear axle through the transmission shafts 36, and the front vertical shafts 29, 29.

As shown, the driving gears 23 of the front traction wheels are on the inner sides of said wheels, and the driving gears 24 of the rear traction wheels are on the outer sides thereof, but the positions of these front and rear driving gears may be reversed, if desired.

There are the front and rear transverse steering bars 39, 40, and attached to the front spindles 11, are the rearwardly extended steering arms 41, 41, whose rear ends are upturned and fitted loosely through bearings in the corresponding ends of the steering bar 39. Fastened to the rear spindles 12, are the forwardly extending steering rods 42, 42, whose forward ends are up-turned and fitted loosely through bearings in the ends of the steering bar 40.

Front and rear steering levers 43, 44, are provided. These levers are pivoted to the cross-bars 45, and 3, respectively, forming part of the vehicle framework. The forward end of the lever 43 has a slidable pivotal connection with the front steering bar 39, and the rear end of the lever has a slidable pivotal connection with the rear steering bar 40. The adjacent ends of these levers 43, 44, are formed with arcuate racks 46, 47, in mesh with a worm gear 48 between them. This gear has a beveled pinion 49 fixed thereon, and in mesh with the bevel gear 50, which is fixed on the lower end of the steering shaft 51 which has the usual steering wheel 52 attached to the upper end thereof.

When the steering shaft is turned in one direction, it will operate through the steering mechanism described, to steer the front wheels in a corresponding direction, and will also operate to steer the rear wheels in the opposite direction to effect a short turning movement of the vehicle.

The drawings and description disclose what is now considered to be a preferred form of the invention by way of illustration only, while the broad principle of the invention will be defined by the appended claims.

What I claim is:

1. A motor vehicle comprising a chassis, a pair of front wheels and a pair of rear wheels supporting the chassis, the wheels of one pair being located outside of the side members of the chassis and the wheels of the other pair being located inside of the side members of the chassis, driving connections between the inner sides of the outer wheels and the outer sides of the inner wheels, a motor on the vehicle, and means operatively connecting one pair of wheels with the motor.

2. A motor vehicle comprising a frame, a pair of front wheels and a pair of rear wheels supporting the frame, driving connections between the inner sides of one pair of wheels and the outer sides of the other pair of wheels, a motor on the vehicle and means operatively connecting one pair of wheels with the motor.

G. C. STREET, Jr.